US012276152B2

(12) United States Patent
Barbon et al.

(10) Patent No.: US 12,276,152 B2
(45) **Date of Patent: *Apr. 15, 2025**

(54) DOOR CLOSER CASINGS

(71) Applicant: Schlage Lock Company LLC, Carmel, IN (US)

(72) Inventors: Mitchell T. Barbon, Indianapolis, IN (US); Jonah M. Pattar, Bangalore (IN)

(73) Assignee: Schlage Lock Company LLC, Carmel, IN (US)

( * ) Notice: Subject to any disclaimer, the term of this patent is extended or adjusted under 35 U.S.C. 154(b) by 4 days.

This patent is subject to a terminal disclaimer.

(21) Appl. No.: 17/845,466

(22) Filed: Jun. 21, 2022

(65) Prior Publication Data

US 2023/0116272 A1 Apr. 13, 2023

Related U.S. Application Data

(63) Continuation of application No. 17/115,312, filed on Dec. 8, 2020, now Pat. No. 11,365,575, which is a (Continued)

(51) Int. Cl.
*E05F 3/00* (2006.01)
*E05F 3/10* (2006.01)
(Continued)

(52) U.S. Cl.
CPC ................ *E05F 3/102* (2013.01); *E05F 3/12* (2013.01); *E05F 3/227* (2013.01); (Continued)

(58) Field of Classification Search
CPC . E05F 1/1025; E05F 1/04; E05F 1/105; E05F 1/1041; E05F 1/1008; E05F 3/10; E05F 3/12; E05F 3/104; E05F 3/102; E05F 3/22; E05F 3/221; E05F 3/223; E05F 3/227; E05Y 2201/212; E05Y 2201/25;
(Continued)

(56) References Cited

U.S. PATENT DOCUMENTS 2,244,161 A 6/1941 Johnson
2,293,903 A 8/1942 Johnson
(Continued)

FOREIGN PATENT DOCUMENTS

CA 2320662 A1 * 4/2001 ................ E05F 3/10
EP 3339546 A1 * 6/2018 ................ E05F 1/00
(Continued)

*Primary Examiner* — Chuck Y Mah
(74) *Attorney, Agent, or Firm* — Taft Stettinius & Hollister LLP

(57) ABSTRACT

An example door closer includes a casing and a pinion rotatably mounted to the casing. The pinion is operable to rotate through a plurality of movement zones, and the door closer is configured to exert forces on the pinion as the pinion moves through the plurality of movement zones. The door closer further includes a plurality of adjustment mechanisms, each operable to adjust the force exerted on the pinion as the pinion travels through a corresponding movement zone. The casing is provided with indicia that correlate each of the adjustment mechanisms to the corresponding movement zone.

22 Claims, 9 Drawing Sheets

Related U.S. Application Data continuation of application No. 16/446,103, filed on Jun. 19, 2019, now Pat. No. 10,858,872.

(60) Provisional application No. 62/687,072, filed on Jun. 19, 2018.

(51) Int. Cl.
*E05F 3/12* (2006.01)
*E05F 3/22* (2006.01)

(52) U.S. Cl.
CPC ..... *E05Y 2201/41* (2013.01); *E05Y 2201/716* (2013.01); *E05Y 2600/45* (2013.01); *E05Y 2600/46* (2013.01); *E05Y 2900/132* (2013.01)

(58) Field of Classification Search
CPC ......... E05Y 2201/256; E05Y 2201/618; E05Y 2201/716; E05Y 2201/722; E05Y 2201/11; E05Y 2201/474; E05Y 2201/492; E05Y 2900/132; E05Y 2400/818; E05Y 2201/41; E05Y 2600/45; E05Y 2600/46; Y10T 16/577; Y10T 16/2804; Y10T 16/285; Y10T 16/293; Y10T 16/585; Y10T 16/299; Y10T 16/286; Y10T 16/27
See application file for complete search history.

(56) References Cited

U.S. PATENT DOCUMENTS

| | | | | | |
|---|---|---|---|---|---|
| 2,586,135 | A | | 2/1952 | Woodruff | |
| 2,679,864 | A | | 6/1954 | Harke | |
| 2,767,681 | A | | 10/1956 | Pontius | |
| 2,815,230 | A | | 12/1957 | Howie | |
| 3,441,249 | A | | 4/1969 | Aslan | |
| 3,512,550 | A | | 5/1970 | Ammann | |
| 3,534,773 | A | | 10/1970 | Hendrickson | |
| 4,195,552 | A | | 4/1980 | Neff | |
| 4,378,612 | A | | 4/1983 | Beers | |
| 4,381,797 | A | * | 5/1983 | Neff | F15B 13/02 251/266 |
| 4,386,446 | A | | 6/1983 | Zunkel et al. | |
| 4,573,238 | A | | 3/1986 | Phillips | |
| 4,783,882 | A | | 11/1988 | Frolov | |
| 5,187,835 | A | | 2/1993 | Lee | |
| 5,272,787 | A | * | 12/1993 | Salena | E05F 3/102 16/56 |
| 5,414,894 | A | | 5/1995 | Fayngersh | |
| 5,531,712 | A | | 7/1996 | Malcolm et al. | |
| 6,052,929 | A | * | 4/2000 | Canadas | G09F 3/00 40/594 |
| 6,282,750 | B1 | | 9/2001 | Bishop et al. | |
| D613,698 | S | | 4/2010 | Radau | |
| 8,732,905 | B2 | | 5/2014 | Bell | |
| 9,695,620 | B2 | | 7/2017 | Zasowski et al. | |
| 2011/0197391 | A1 | | 8/2011 | Yu et al. | |
| 2014/0331913 | A1 | | 11/2014 | Emanuel et al. | |
| 2016/0273257 | A1 | | 9/2016 | Hickman | |
| 2019/0145543 | A1 | | 5/2019 | Huddleston | |
| 2019/0249784 | A1 | | 8/2019 | Komatsuzaki et al. | |

FOREIGN PATENT DOCUMENTS

| | | | | | |
|---|---|---|---|---|---|
| EP | 3660250 | A1 | * | 6/2020 | E05F 1/08 |
| WO | WO-2015066265 | A1 | * | 5/2015 | E05F 3/00 |

* cited by examiner

DOOR CLOSER CASINGS

CROSS-REFERENCE TO RELATED APPLICATIONS

The present application is a continuation of U.S. patent application Ser. No. 17/115,312 filed Dec. 8, 2020 and issued as U.S. Pat. No. 11,365,575, which is a continuation of U.S. patent application Ser. No. 16/446,103 filed Jun. 19, 2019 and issued as U.S. Pat. No. 10,858,872, which claims the benefit of U.S. Provisional Patent Application No. 62/687,072, filed on Jun. 19, 2018, the contents of each application incorporated herein by reference in its entirety.

TECHNICAL FIELD

The present disclosure generally relates to door closers, and more particularly but not exclusively relates to casings for such door closers.

BACKGROUND

Door closers are frequently installed to doors to control the rate of speed with which the door opens and closes, and to aid in returning the door to the closed position. Some such systems have certain limitations, including those relating to ease of adjustment and perceived durability. Therefore, a need remains for further improvements in this technological field.

SUMMARY

Figure 1:
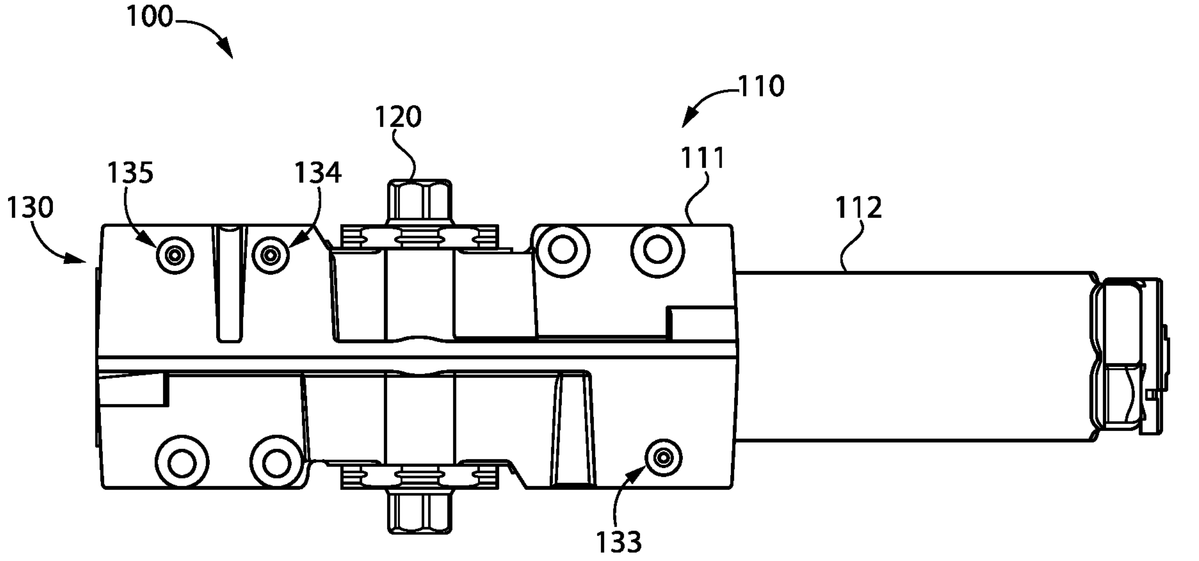
FIG. 1 is a plan view of a door closer.

An example door closer includes a casing and a pinion rotatably mounted to the casing. The pinion is operable to rotate through a plurality of movement zones, and the door closer is configured to exert forces on the pinion as the pinion moves through the plurality of movement zones. The door closer further includes a plurality of adjustment mechanisms, each operable to adjust the force exerted on the pinion as the pinion travels through a corresponding movement zone. The casing is provided with indicia that correlate each of the adjustment mechanisms to the corresponding movement zone. Further forms, features, and functions of the disclosed subject matter are provided herein.

DETAILED DESCRIPTION OF ILLUSTRATIVE EMBODIMENTS

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

With reference to FIG. 1, illustrated therein is an example of a door closer 100. The closer 100 includes a casing 110, a pinion 120 rotatably mounted to the casing 110, and an adjustment assembly 130 that aids in adjusting the operating characteristics of the closer 100. The closer 100 is configured for installation to a closure assembly including a frame and a swinging door pivotably mounted in the frame. When installed to the closure assembly, the casing 110 is mounted to one of the door or the frame, and an armature assembly is mounted to the other of the door or the frame. The armature assembly is coupled with the pinion 120 such that swinging movement of the door causes a corresponding rotation of the pinion 120. The armature assembly may be a standard arm assembly in which the arms project outward from the door, or may be a parallel arm assembly in which the arms are generally parallel to the door when the door is in the closed position. The adjustment assembly 130 includes an arm selection valve that can be adjusted to account for the operational differences between the standard and parallel arm configurations.

The casing 110 includes a body portion 111 and a cylindrical tube 112 extending from the body portion 111. The casing 110 cooperates with the tube 112 to define a hydraulic chamber that is filled with a hydraulic fluid, and which has a rack gear mounted therein. The rack gear is engaged with the pinion 120, and is operable to move in a door closing direction and a door opening direction. A spring is mounted in the tube 112 and urges the rack gear in the door closing direction, thereby urging the door in the corresponding closing direction. The casing 110 includes a plurality of hydraulic passages that provide paths of fluid communication between a first chamber and a second chamber during the various stages of the open/close cycle. The first chamber and the second chamber are separated from one another by an end of the rack gear such that movement of the rack gear expands one chamber while contracting the other chamber. During such movement, the hydraulic fluid flows through the appropriate passage from the contracting chamber to the expanding chamber. As will be appreciated, the rate at which the rack gear is able to move depends in part upon the rate at which the fluid is able to move from the contracting chamber to the expanding chamber. Each passage is provided with an adjustable valve that controls the rate at which the fluid is capable of flowing through the corresponding passage, thereby controlling the speed of the rack gear and the speed of the door as the door moves through the corresponding door movement. Further details regarding an example door closer including such hydraulic passages and valves are provided below with reference to FIG. 3.

Figure 2:
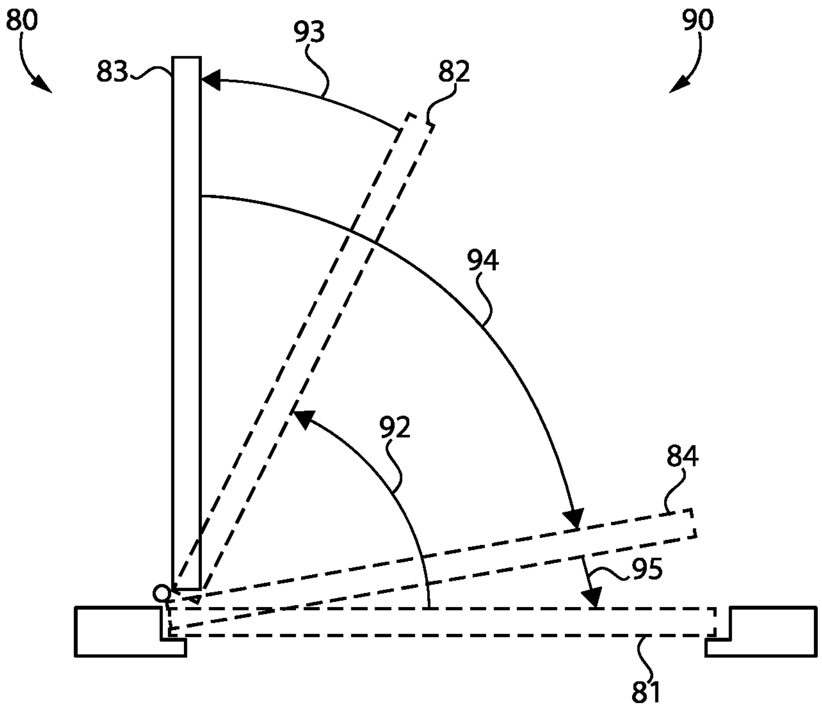
FIG. 2 is a schematic illustration of a door during an open/close cycle.

With additional reference to FIG. 2, illustrated therein is a schematic representation of a closure assembly including a door 80 during a full open/close cycle 90. Those skilled in the art will readily appreciate that when the closer 100 is installed to the closure assembly, movement of the door 80 through a particular door movement zone is correlated with rotation of the pinion 120 through a corresponding pinion movement zone and movement of the rack gear through a corresponding rack gear movement zone.

During the exemplary open/close cycle 90, the door 80 starts at a closed position 81, and moves from the closed position 81 through a main opening swing 92 to a backcheck position 82, for example under the urging of a user. Continued movement of the door 80 in the opening direction proceeds from the backcheck position 82 through a backcheck movement 93 to a fully open position 83. The closer 100 is configured to slow the speed of the door 80 through the backcheck movement 93 to prevent the door 80 from slamming open. The resistance offered by the closer 100 during the backcheck movement 93 is controlled by a backcheck valve 133.

When the door 80 is released from the fully open position 83, the spring of the closer 100 drives the door 80 in a closing direction, while the hydraulic fluid resists such movement and slows the door speed. The closing movement of the door 80 includes a main closing swing 94, in which the door 80 moves from the open position 83 to a latching position 84. The speed of the door 80 during the main closing swing 94 is regulated by a closing swing valve 134. From the latching position 84, the door 80 returns to the closed position 81 by undergoing a latching movement 95. The speed of the door 80 during the latching movement 95 is regulated by a latching valve 135.

During installation of the closer 100, the installer will typically adjust one or more of the valves 133, 134, 135 to provide the door 80 with desired speed characteristics for the corresponding movement 93, 94, 95. For example, the installer may rotate the backcheck valve 133 in one direction to increase the resistance provided during the backcheck movement 93, or may rotate the backcheck valve 133 in an opposite direction to decrease the resistance provided during the backcheck movement 93. Similar adjustments can be made to the forces provided by the closer 100 during the main closing swing 94 and the latching movement 95 by appropriate manipulation of the corresponding valves 134, 135. When installing certain existing closers, the installer will typically make reference to the installation manual for instructions as to which valve should be rotated in which direction in order to provide for the desired adjustment.

In addition to adjusting the closer 100 at the time of installation, it may become desirable for the closer to be adjusted periodically. When the closer 100 is installed at or near an exterior door of a facility, for example, the viscosity of the hydraulic fluid may vary with the environmental temperature, thereby causing corresponding variations in the hydraulic resistance provided as the fluid flows through the passages. As such, the valves may need to be adjusted to a less resistive or faster position during colder seasons, and adjusted to a more resistive or slower position during warmer seasons. When adjusting certain existing closers, the installer will typically again make reference to the installation manual for instructions as to which valve should be rotated in which direction in order to provide for the desired adjustment.

Figure 3:
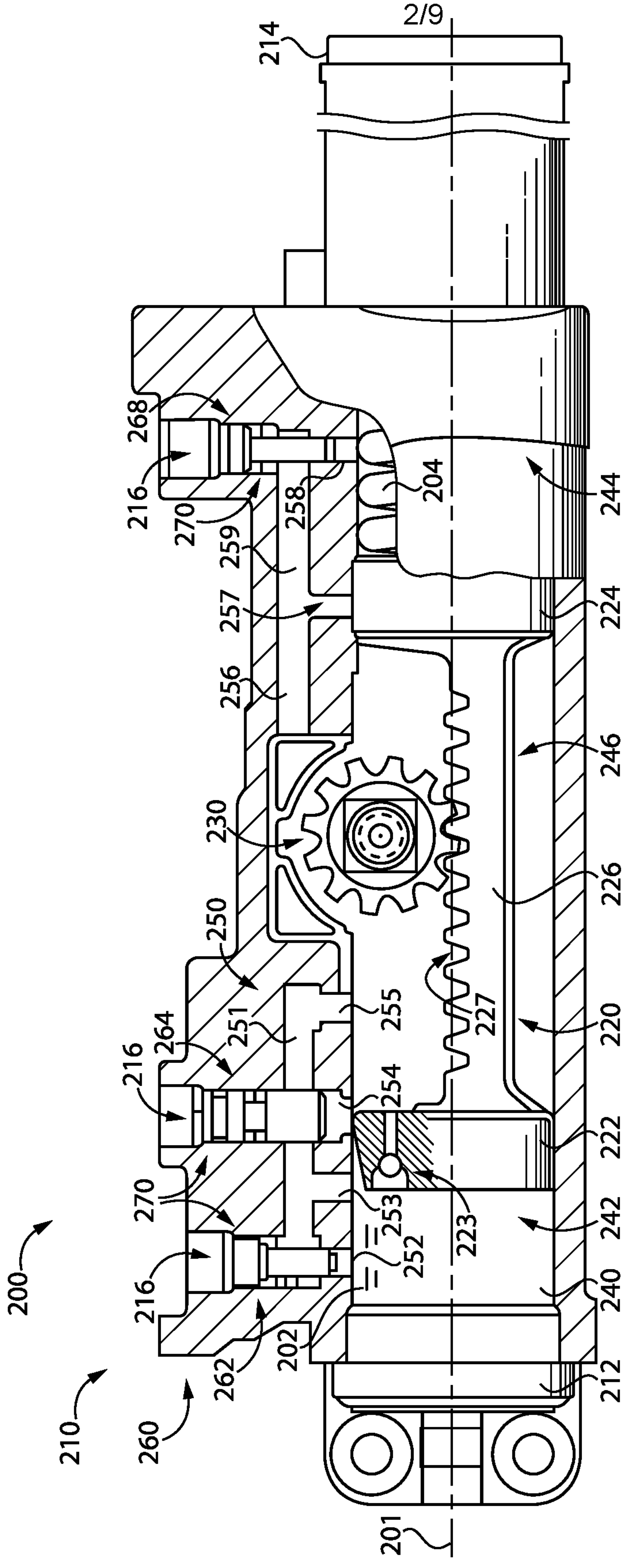
FIG. 3 is a cross-sectional illustration of a door closer according to certain embodiments.

With additional reference to FIG. 3, illustrated therein is a cross-sectional view of an example door closer 200 according to certain embodiments. The door closer 200 extends along a longitudinal axis 201 defining a proximal direction (to the left in FIG. 2) and an opposite distal direction (to the right in FIG. 2). The closer 200 generally includes a casing 210, a piston 220 mounted for reciprocal movement within the housing, and a pinion 230 rotatably mounted to the casing 210 and engaged with the piston 220. The casing 210 defines a hydraulic chamber 240 including a plurality of sub-chambers and a plurality of passages 250 defining paths of fluid communication between the sub-chambers. The hydraulic chamber 240 is filled with a hydraulic fluid 202 that, as described herein, flows through the passages 250 during operation of the closer 200. The closer 200 further includes an adjustment assembly 260 including a plurality of valves 270 that regulate the flow of the hydraulic fluid 202 through the passages 250.

The casing 210 defines the hydraulic chamber 240, and is filled with the hydraulic fluid 202. The casing 210 includes a proximal end cap 212 enclosing a proximal end of the hydraulic chamber 240, and a distal end cap 214 enclosing a distal end of the hydraulic chamber 240. Also disposed in the casing 210 is a spring 204, which is engaged with the piston 220 and biases the piston 220 in the proximal direction, which is correlated with closing movement of the door. The casing 210 further defines a plurality of apertures 216, each of which is in fluid communication with one of the passages 250 and houses a corresponding and respective one of the valves 270.

The piston 220 is mounted for reciprocal movement within the hydraulic chamber 240, and generally includes a proximal wall 222, a distal wall 224, and a body portion 226 extending between and connecting the proximal wall 222 and the distal wall 224. The proximal wall 222 and the distal wall 224 are closely engaged with the inner wall of the casing 210 and separate the hydraulic chamber 240 into three sub-chambers. The proximal wall 222 includes a check valve 223, and the body portion 226 defines a rack gear 227 that is engaged with the pinion 230.

The pinion 230 is rotatably mounted to the casing 210 and is engaged with the rack gear 227 such that rotation of the pinion 230 is correlated with the reciprocal movement of the piston 220. A door control arm is mounted to the pinion 230 and is engaged with either the door or the doorframe such that swinging movement of the door is correlated with rotation of the pinion 230, linear movement of the piston 220, and compression/extension of the spring 204. For example, opening movement of the door is correlated with rotation of the pinion 230 in a door-opening direction (counter-clockwise in FIG. 2), distal movement of the piston 220, and compression of the spring 204. Conversely, closing movement of the door is correlated with rotation of the pinion 230 in a door-closing direction (clockwise in FIG. 2), proximal movement of the piston 220, and expansion of the spring 204.

The hydraulic chamber 240 is divided into three portions or sub-chambers by the piston 220. More particularly, a proximal chamber 242 is defined between the proximal wall 222 and the proximal end cap 212, a distal chamber 244 is defined between the distal wall 224 and the distal end cap 214, and an intermediate chamber 246 is defined between the proximal wall 222 and the distal wall 224. As will be appreciated, the reciprocal movement of the piston 220 causes expansion and contraction of the proximal and distal chambers 242, 244, while the intermediate chamber 246 remains of a substantially constant volume. In certain forms, the hydraulic chamber 240 may be considered to include the passages 250.

The passages 250 include a proximal passage 251 including branches 252-256, and a distal passage 257 including branches 258, 259. The proximal passage 251 forms a path of fluid communication between the proximal chamber 242 and the intermediate chamber 246, and the distal passage 257 forms a fluid connection between the intermediate chamber 246 and the distal chamber 244. The branches 252-255, 257, 258 form selective paths of fluid communication between the various portions of the hydraulic chamber 240 based upon the position of the piston 220, and the adjustment assembly 260 regulates the flow of hydraulic fluid 202 through the passages 250. As described herein, the effective cross-sectional area of the passages 250 depends upon a number of factors, including the state of the adjustment assembly 260 and which of the branches are connected to which of the chambers.

The adjustment assembly 260 includes a plurality of adjustment mechanisms, which in the illustrated embodiment are provided in the form of adjustable regulating valves 270. More particularly, the adjustment assembly 260 includes a latch speed regulating valve 262, a main speed regulating valve 264, and a backcheck speed regulating valve 268, each of which is mounted in a corresponding and respective aperture 216 and extends into a corresponding and respective one of the branches 252, 254, 258. One or more of the regulating valves may be provided in the form of a regulating screw. Each screw is mounted in the corresponding aperture 216 such that rotation of the screw in a first direction advances the screw towards an advanced position, while rotation of the screw in an opposite second direction withdraws the screw toward a withdrawn position.

FIG. 3 illustrates the closer 200 with the piston 220 in a position corresponding to the main swing zone of the door 80. In this state, the proximal chamber 242 is in fluid communication with the intermediate chamber 246 via the first passage 251. More particularly, the branches 252, 253 are open to the proximal chamber 242, and the branches 254, 255 are open to the intermediate chamber 246. During opening movement of the door, the piston 220 moves in the distal direction, thereby compressing the spring 204, expanding the proximal chamber 242, and contracting the distal chamber 244. As a result, fluid 202 flows from the distal chamber 244 into the intermediate chamber 246 via the distal passage 257. Fluid 202 also flows the intermediate chamber 246 to the proximal chamber 242 via the check valve 223 and the proximal passage 251. During closing movement of the door, the piston 220 moves in the proximal direction, thereby contracting the proximal chamber 242 and expanding the distal chamber 244. As a result, fluid 202 flows from the proximal chamber 242 into the intermediate chamber 246 via the proximal passage 251, and flows from the intermediate chamber 246 into the distal chamber 244 via the distal passage 257.

As will be appreciated, the rate of fluid flow through the passages 250 is correlated with the movement speed of the piston 220, and thus with the rotational speed of the pinion 230 and the movement speed of the door 80. The rate of fluid flow through the passages 250 depends upon a number of factors. One such factor is the effective cross-sectional area of the passage, which can be altered by manipulation of the adjustment assembly 260. For example, advancing the screw of the main speed adjustment valve 264 may reduce the effective cross-sectional area of the proximal passage 251 at the branch 254, thereby reducing the rotational speed of the pinion 230 and the closing speed of the door 80 in the main swing zone. As another example, withdrawing the screw of the latch speed adjustment valve 262 increases the effective cross-sectional area of the proximal passage 251 at the branch 252, thereby increasing the closing speed of the pinion 230 and the door 80 in the latching zone 95.

In the illustrated form, the forces exerted by the closer 200 on the pinion 230, and thus the rotational speed of the pinion 230 through its various movement zones, are modulated in part by hydraulic forces. More particularly, each movement zone corresponds to one or more passages through which hydraulic fluid 202 flows as the pinion 230 rotates through that movement zone. Accordingly, the adjustment mechanisms of the adjustment assembly 260 are provided in the form of regulating valves 270 operable to adjust the effective cross-sectional areas of the fluid flow passages.

In other embodiments, the rotational speed of the pinion 230 may be modulated at least in part by electromechanical forces, for example in the event that a motor/generator is operably coupled with the pinion 230. In such forms, the adjustment mechanisms may take another form, such as one appropriate to adjust the electromechanical forces applied by the motor/generator as the pinion 230 rotates through the corresponding movement zone. By way of example, such an adjustment mechanism may take the form of a rheostat or another device that varies the forces imparted by the motor/generator as the pinion 230 rotates through the corresponding movement zone. Thus, while certain embodiments are described herein with specific reference to the illustrated valves, it is to be appreciated that the indicia described herein may alternatively be used in combination with adjustment mechanisms of other types.

Figure 4:
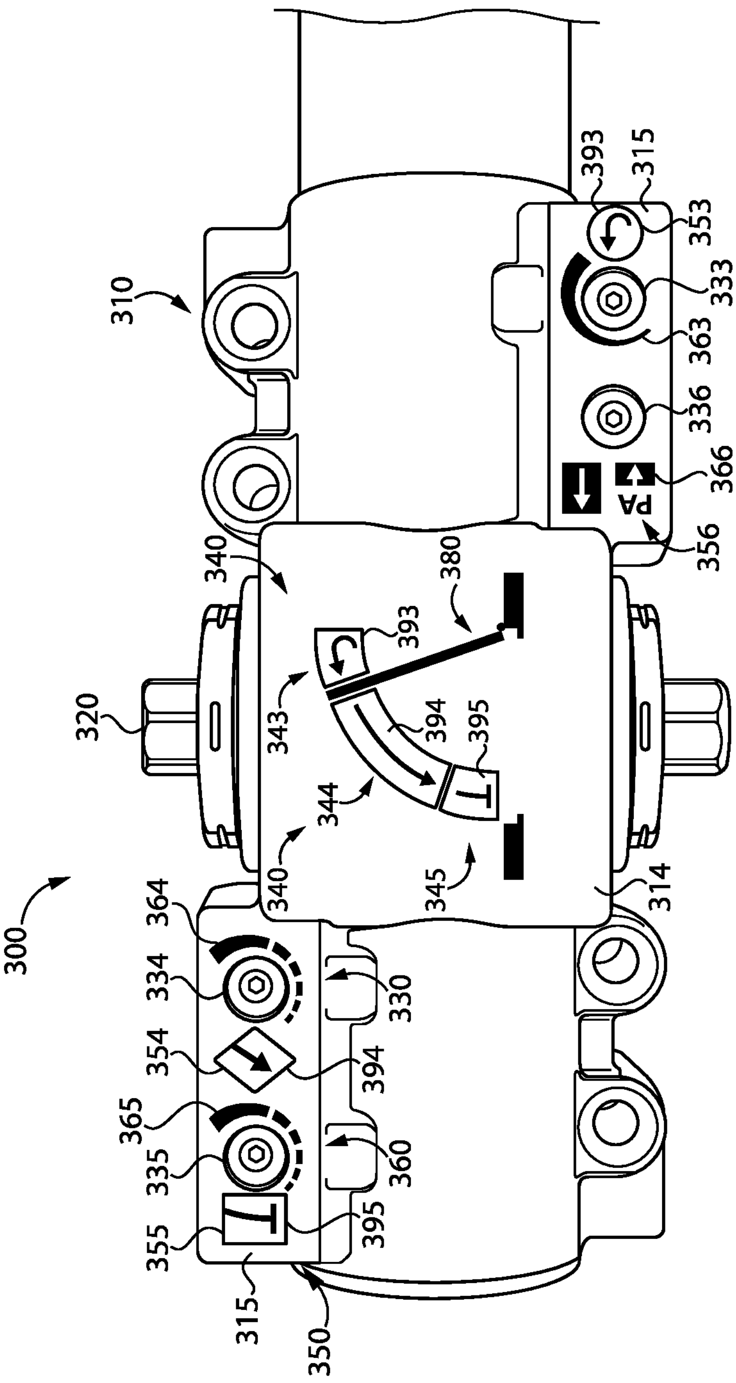
FIG. 4 illustrates a door closer including indicia according to certain embodiments.

With additional reference to FIG. 4, illustrated therein is an embodiment of a door closer 300 that may facilitate the use of the adjustment assembly 330 thereof, thereby providing for increased ease of installation and maintenance. The closer 300 includes certain features that are similar to the above-described closer 100, and which are indicated with similar reference characters. For example, the closer 300 includes a casing 310, a pinion 320, and an adjustment assembly 330, which respectively correspond to the above-described casing 110, pinion 120, and adjustment assembly 130. In the interest of conciseness, the following description focuses primarily on elements and features that differ from those described above with reference to the closer 100.

The casing 310 of the closer 300 includes a plurality of flat portions for accommodating indicia relating to the adjustment of the valves of the adjustment assembly 330. More particularly, the casing 310 includes a main flat portion 314 for accommodating door swing indicia 340 and additional flat portions 315 for accommodating valve function indicia 350 and valve adjustment indicia 360. The movement zone indicia 340 generally relate to the door movements 90, and cooperate with the valve function indicia 350 to identify the valves of the adjustment assembly 130 with respect to the corresponding movements 90. Additionally, the casing 310 may be provided with indicia 380 representing the door 80, for example to provide context for the movement zone indicia 340.

The movement zone indicia 340 generally include backcheck movement indicia 343 relating to the backcheck movement 93, main swing indicia 344 relating to the main closing swing movement 94, and latching movement indicia 345 relating to the latching movement 95. Each of the valve function indicia 350 is associated with (e.g., positioned adjacent to) a corresponding valve of the adjustment assembly 330, and the movement zone indicia 340 provide a key that relates the valve function indicia 350 to the corresponding door movement, and thus to the corresponding movements of the pinion 320. Each of the valve adjustment indicia 360 is also associated with a corresponding one of the valves 330, and identifies the direction in which the corresponding valve 330 is to be rotated to produce a desired effect (e.g. increasing and/or decreasing the forces applied to the pinion 320 and the door 80 within the corresponding movement zone).

Backcheck function indicia 353 are associated with the backcheck valve 333, and correspond to the backcheck movement indicia 343. More particularly, each set of indicia 343, 353 includes a corresponding instance of a shared backcheck symbol 393. In the illustrated form, the backcheck symbol 393 is provided in the form of a U-turn arrow, which corresponds to the travel of the door 80 in the backcheck zone 93. Also associated with the backcheck valve 333 are backcheck adjustment indicia 363, which relate the rotational directions of the valve 333 with the adjustments that are effected by rotating the valve 333. More specifically, the indicia 363 take the form of an arc that wraps around a portion of the valve 333 and has a thickness that increases in the clockwise direction.

Main swing function indicia 354 are associated with the main swing valve 334, and correspond to the main swing movement indicia 344. More particularly, each set of indicia 344, 354 includes corresponding instance of a shared main swing symbol 394. In the illustrated form, the main swing symbol 394 is provided in the form of a line with an arrowhead, which corresponds to the travel of the door 80 through the main swing zone 94. Main swing adjustment indicia 364 are also associated with the main swing valve 334, and relate the rotational directions of the valve 334 with the adjustments that are effected by rotating the valve 334. More specifically, the indicia 364 take the form of an arc that wraps around a portion of the valve 334. The arc has a plurality of arc segments that increase in thickness and length in the counter-clockwise direction. This indicates that rotating the valve 334 in the counter-clockwise direction increases the movement speed during the main swing movement 94, while rotating the valve 334 in the clockwise direction decreases the door speed during the main swing movement 94.

Latching function indicia 355 are associated with the latching valve 335, and correspond to the latching movement indicia 345. More particularly, each set of indicia 345, 355 includes corresponding instance of a shared latching symbol 395. In the illustrated form, the latching symbol 395 is provided in the form of a line with a flat end, which corresponds to the travel of the door 80 through the latching zone 95 to the closed position. Latching adjustment indicia 365 are also associated with the latching valve 335, and relate the rotational directions of the valve 335 with the adjustments that are effected by rotating the valve 335. More specifically, the indicia 365 take the form of an arc that wraps around a portion of the valve 335. The arc has a plurality of arc segments that increase in thickness and length in the counter-clockwise direction. This indicates that rotating the valve 335 in the counter-clockwise direction increases the movement speed during the latching movement 95, while rotating the valve 335 in the clockwise direction decreases the door speed during the latching movement 95.

Parallel arm function indicia 356 are associated with the parallel arm valve 336. The indicia 356 include the letters "PA," which indicates that the valve 336 controls the parallel arm function. Parallel arm adjustment indicia 366 include a short block with a downward-pointing arrow adjacent the function indicia 356, which indicates that the valve 336 should be screwed in to its recessed position (i.e., rotated in the clockwise direction) for the parallel arm configuration. The indicia 356 further include a long block with an upward-pointing arrow, which indicates that for other configurations, the valve 336 should be unscrewed to its outward or withdrawn position (i.e., rotated in the counter-clockwise direction).

In certain embodiments, the indicia described hereinabove may be printed on the surface of the casing 310, while in other embodiments the indicia may be provided to an intermediate element (e.g., a sticker or decal) that is applied to the casing 310. In certain forms, one or more of the indicia may be color-coded. For example, the backcheck indicia 393 may be provided in a first color (e.g., red), the main swing indicia 394 may be provided in a second color (e.g., green), and the latching indicia 395 may be provided in a third color (e.g., blue).

While examples of illustrative indicia have been described with reference to FIG. 4, it is to be appreciated that one or more sets of indicia may take another form. Certain examples of such alternative indicia are illustrated in FIGS. 5 and 6.

Figure 5:
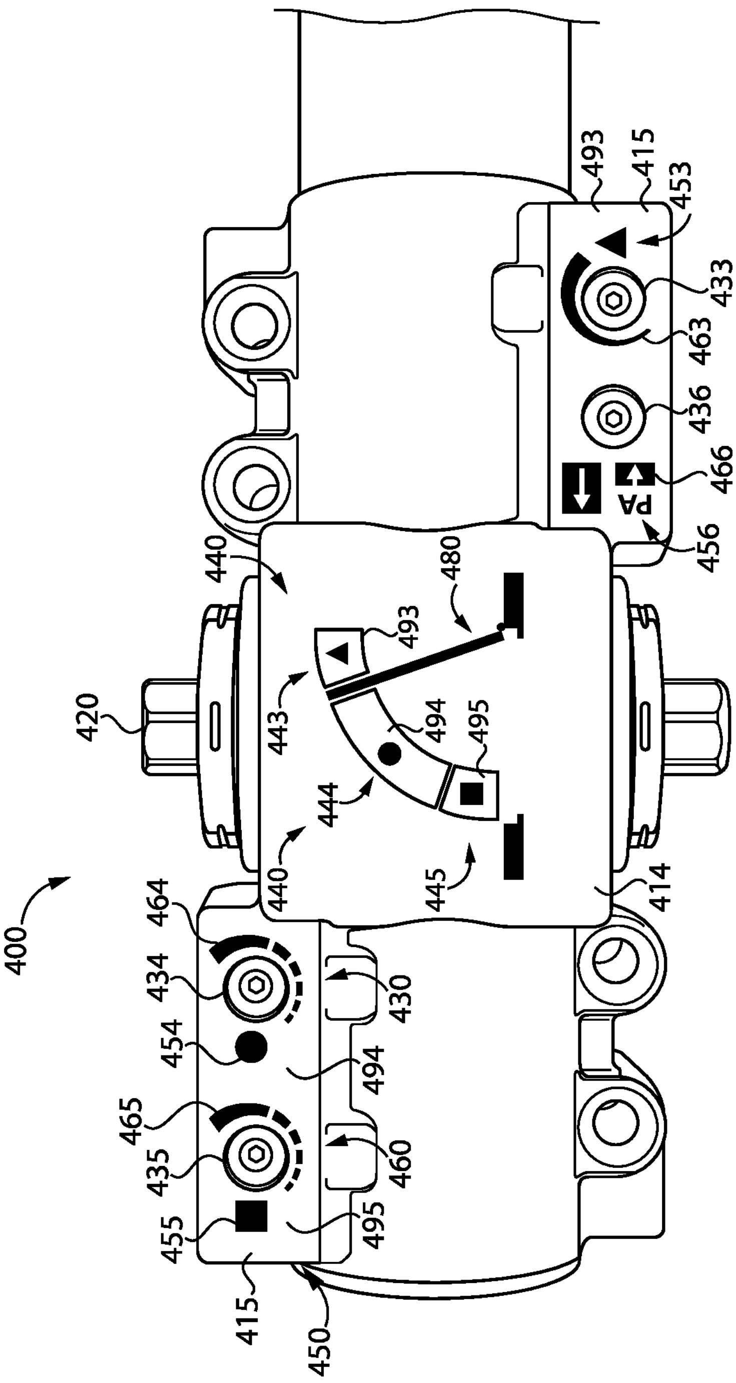
FIG. 5 illustrates a door closer including indicia according to certain embodiments.
Figure 6:
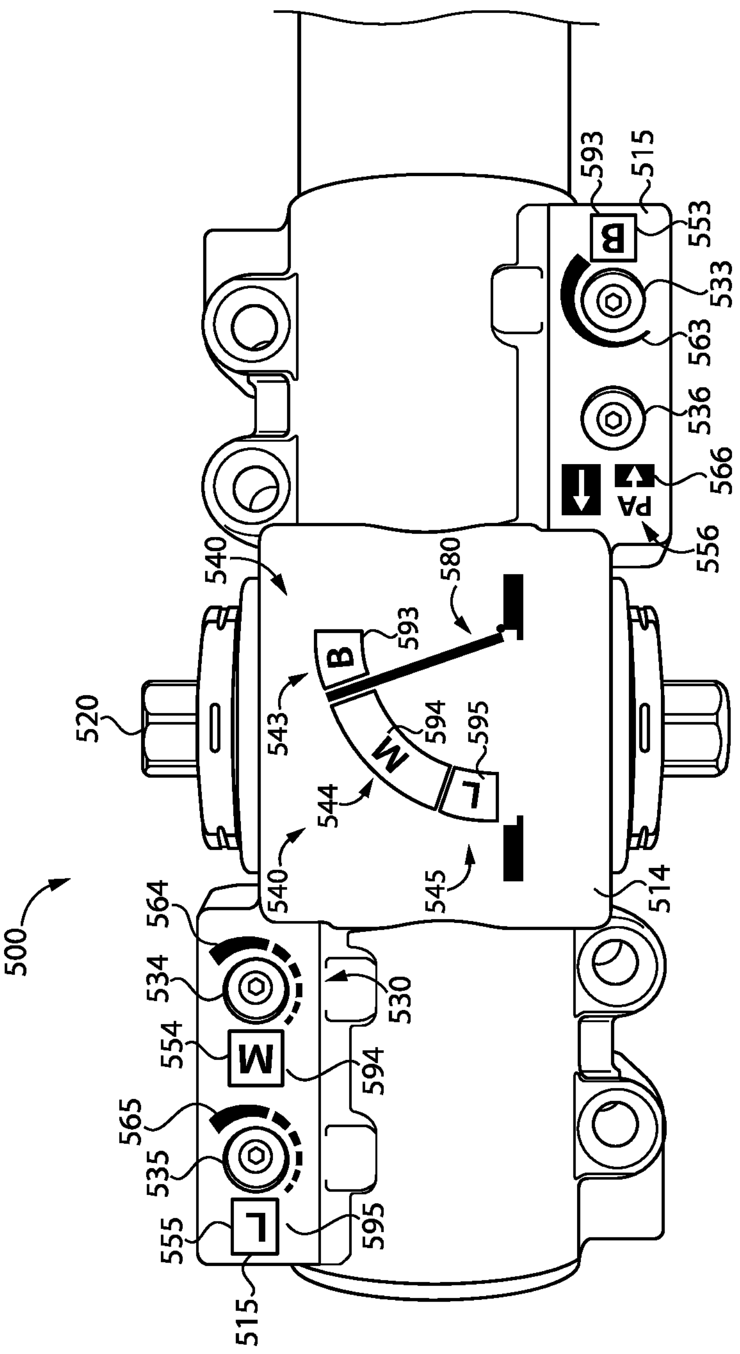
FIG. 6 illustrates a door closer including indicia according to certain embodiments.

With reference to FIG. 5, illustrated therein is a closer 500 in which indicia are provided in the form of symbols, and more particularly in the form of geometric shapes. In the illustrated embodiment, the backcheck symbol 493 is provided as a triangle, the main swing symbol 494 is provided as a circle, and the latching symbol 495 is provided as a square.

Each of the backcheck movement indicia 443 and the backcheck valve indicia 453 includes a corresponding instance of the backcheck symbol 493. The backcheck symbol 493 is thus shared by the indicia 443, 453, thereby indicating that the valve associated with the backcheck valve indicia 453 (i.e., the backcheck valve 433) corresponds to the backcheck movement zone 93 and the corresponding movement zone of the pinion 420. These indicia, when taken in combination with the backcheck valve adjustment indicia 463, indicate that rotation of the backcheck valve 433 in a first rotational direction serves to increase the movement speed in the backcheck zone 93, while rotation of the backcheck valve 433 in the opposite second rotational direction serves to decrease the movement speed in the backcheck zone 93.

Each of the main swing movement indicia 444 and the main swing valve indicia 454 includes a corresponding instance of the main swing movement symbol 494. The main swing movement symbol 494 is thus shared by the indicia 444, 454, thereby indicating that the valve associated with the main swing valve indicia 454 (i.e., the main swing valve 434) corresponds to the main swing movement zone 94 and the corresponding movement zone of the pinion 420. These indicia, when taken in combination with the main swing valve adjustment indicia 464, indicate that rotation of the main swing valve 434 in a first rotational direction serves to increase the movement speed in the main swing zone 94, while rotation of the main swing valve 434 in the opposite second rotational direction serves to decrease the movement speed in the main swing zone 94.

Each of the latching movement indicia 445 and the latching valve indicia 455 includes a corresponding instance of the latching symbol 495. The latching symbol 495 is thus shared by the indicia 445, 455, thereby indicating that the valve associated with the latching valve indicia 455 (i.e., the latching valve 435) corresponds to the latching movement zone 95 and the corresponding movement zone of the pinion 420. These indicia, in combination with the latching valve adjustment indicia 465, indicate that rotation of the main swing valve 435 in a first rotational direction serves to increase the movement speed in the latching zone 95, while rotation of the latching valve 435 in the opposite second rotational direction serves to decrease the movement speed in the latching zone 95.

Parallel arm function indicia 456 are associated with the parallel arm valve 436. The indicia 456 include the letters "PA," which indicates that the valve 436 controls the parallel arm function. Parallel arm adjustment indicia 466 include a short block with a downward-pointing arrow adjacent the function indicia 456, which indicates that the valve 436 should be screwed in to its recessed position (i.e., rotated in the clockwise direction) for the parallel arm configuration. The indicia 456 further includes a long block with an upward-pointing arrow, which indicates that for other configurations, the valve 436 should be unscrewed to its outward position (i.e., rotated in the counter-clockwise direction).

In certain embodiments, the above-described indicia may be printed on the surface of the casing 410, while in other embodiments the indicia may be provided to an intermediate element (e.g., a sticker or decal) that is applied to the casing 410. In certain forms, one or more of the indicia may be color-coded. For example, the backcheck indicia 493 may be provided in a first color (e.g., red), the main swing indicia 494 may be provided in a second color (e.g., green), and the latching indicia 495 may be provided in a third color (e.g., blue).

FIG. 6 illustrates a closer 500 in which the shared indicia are provided in the form of letters. More specifically, the backcheck symbol 593 is provided as a "B", the main swing symbol 594 is provided as an "M", and the latching symbol 595 is provided as an "L".

Each of the backcheck movement indicia 543 and the backcheck valve indicia 553 includes a corresponding instance of the backcheck symbol 593. The backcheck symbol 593 is thus shared by the indicia 543, 553, thereby indicating that the valve associated with the backcheck valve indicia 553 (i.e., the backcheck valve 533) corresponds to the backcheck movement zone 93 and the corresponding movement zone of the pinion 520. These indicia, when taken in combination with the backcheck valve adjustment indicia 563, indicate that rotation of the backcheck valve 533 in a first rotational direction serves to increase the movement speed in the backcheck zone 93, while rotation of the backcheck valve 533 in the opposite second rotational direction serves to decrease the movement speed in the backcheck zone 93.

Each of the main swing movement indicia 544 and the main swing valve indicia 554 includes a corresponding instance of the main swing movement symbol 594. The main swing movement symbol 594 is thus shared by the indicia 544, 554, thereby indicating that the valve associated with the main swing valve indicia 554 (i.e., the main swing valve 534) corresponds to the main swing movement zone 94 and the corresponding movement zone of the pinion 520. These indicia, when taken in combination with the main swing valve adjustment indicia 564, indicate that rotation of the main swing valve 534 in a first rotational direction serves to increase the movement speed in the main swing zone 94, while rotation of the main swing valve 534 in the opposite second rotational direction serves to decrease the movement speed in the main swing zone 94.

Each of the latching movement indicia 545 and the latching valve indicia 555 includes a corresponding instance of the latching symbol 595. The latching symbol 595 is thus shared by the indicia 545, 555, thereby indicating that the valve associated with the latching valve indicia 555 (i.e., the latching valve 535) corresponds to the latching movement zone 95 and the corresponding movement zone of the pinion 520. These indicia, in combination with the latching valve adjustment indicia 565, indicate that rotation of the main swing valve 535 in a first rotational direction serves to increase the movement speed in the latching zone 95, while rotation of the latching valve 535 in the opposite second rotational direction serves to decrease the movement speed in the latching zone 95.

Parallel arm function indicia 556 are associated with the parallel arm valve 536. The indicia 556 include the letters "PA," which indicates that the valve 536 controls the parallel arm function. Parallel arm adjustment indicia 566 include a short block with a downward-pointing arrow adjacent the function indicia 556, which indicates that the valve 536 should be screwed in to its recessed position (i.e., rotated in the clockwise direction) for the parallel arm configuration. The indicia 556 further includes a long block with an upward-pointing arrow, which indicates that for other configurations, the valve 536 should be unscrewed to its outward position (i.e., rotated in the counter-clockwise direction).

In certain embodiments, the above-described indicia may be printed on the surface of the casing 510, while in other embodiments the indicia may be provided to an intermediate element (e.g., a sticker or decal) that is applied to the casing 510. In certain forms, one or more of the indicia may be color-coded. For example, the backcheck indicia 593 may be provided in a first color (e.g., red), the main swing indicia 594 may be provided in a second color (e.g., green), and the latching indicia 595 may be provided in a third color (e.g., blue).

Figure 7:
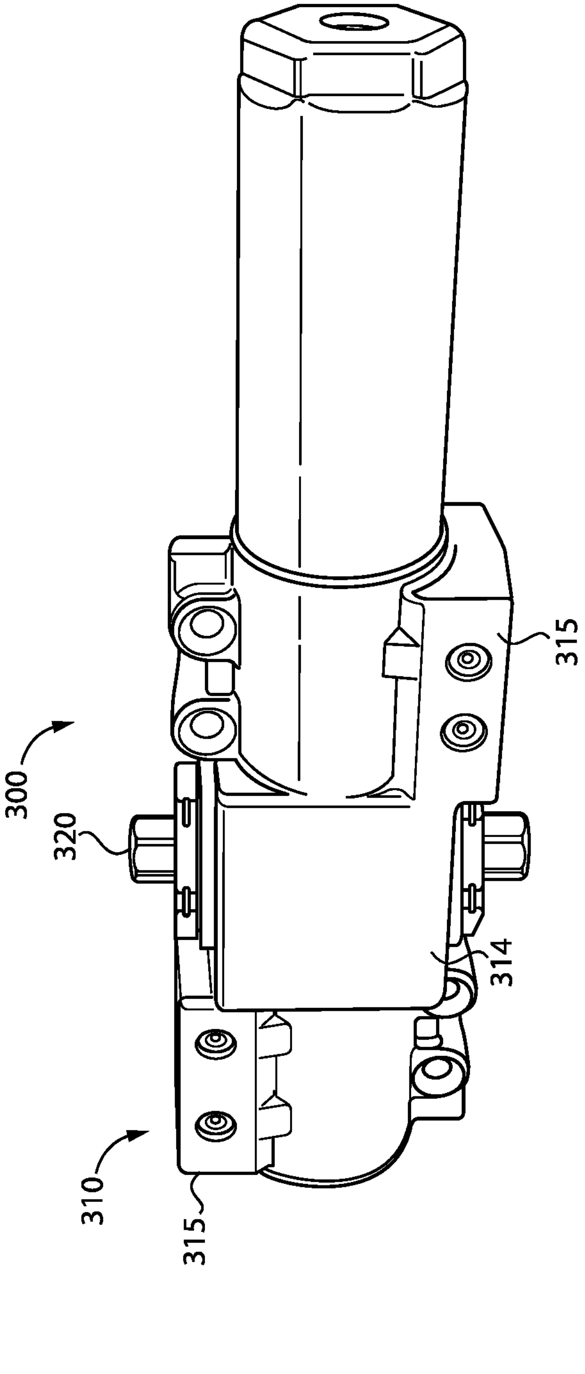
FIG. 7 is a perspective illustration of the door closer illustrated in FIG. 4.

With reference to FIG. 7, illustrated therein is an embodiment of the closer 300 in which the indicia have been omitted for purposes of more clearly illustrating the structure of the casing 310. In comparison to the casing 110 of the door closer 100 described above, the casing 310 of the closer 300 utilizes more material, particularly in those regions that form the flat portions 314, 315. This may lend the closer 300 a more robust appearance, which can be perceived as a sign of increased quality. Additional closers exhibiting similar characteristics are illustrated in FIGS. 8-12.

Figure 8:
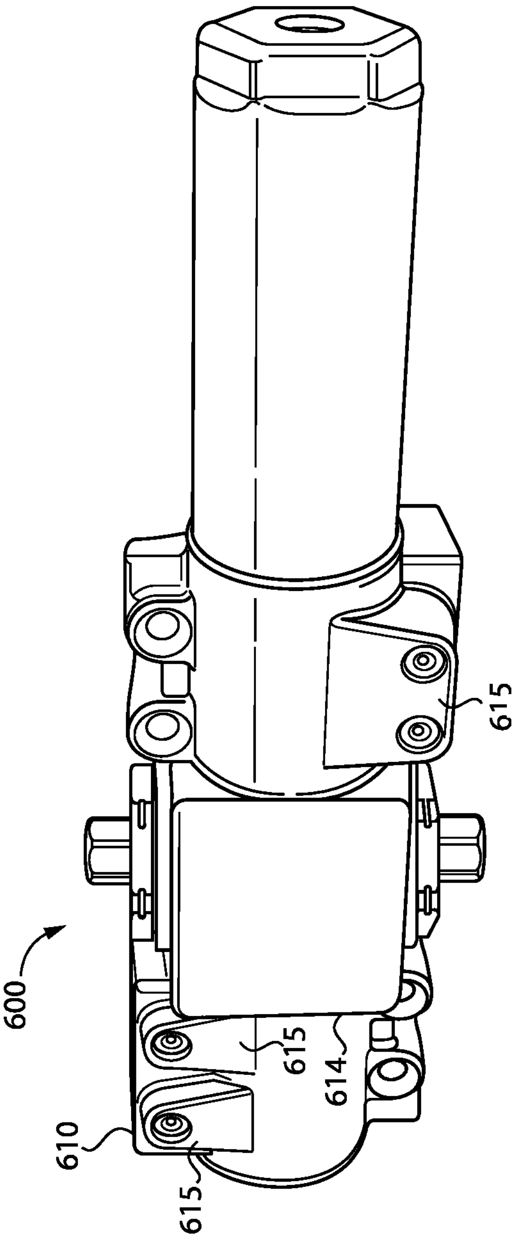
FIG. 8 is a perspective illustration of a door closer including a casing according to certain embodiments.
Figure 9:
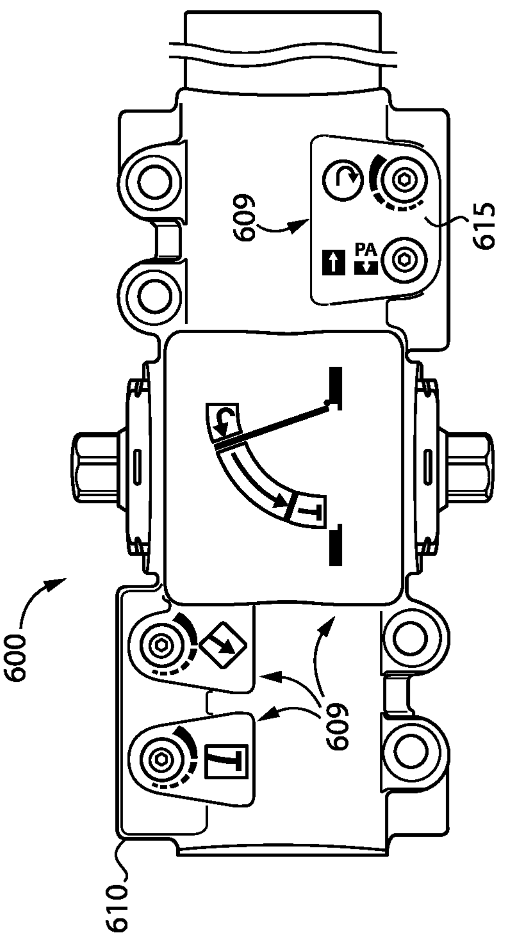
FIG. 9 illustrates the casing of the door closer illustrated in FIG. 8 along with indicia according to certain embodiments.

FIGS. 8 and 9 illustrate another embodiment of a closer 600, in which the casing 610 similarly includes additional material in areas that form flat regions 614, 615. As illustrated in FIG. 9, the casing 610 may be provided with indicia 609 that indicate to the user which of the valves correspond to which of the movement zones. In the illustrated form, the indicia 609 are provided as the arrow-type symbols illustrated in FIG. 4. As should be appreciated, one or more of the indicia 609 may additionally or alternatively be provided in the form of geometric indicia such as those illustrated in FIG. 5, alphanumeric indicia such as those illustrated in FIG. 6, and/or in another form. Furthermore, the indicia 609 may or may not be color-coded.

Figure 10:
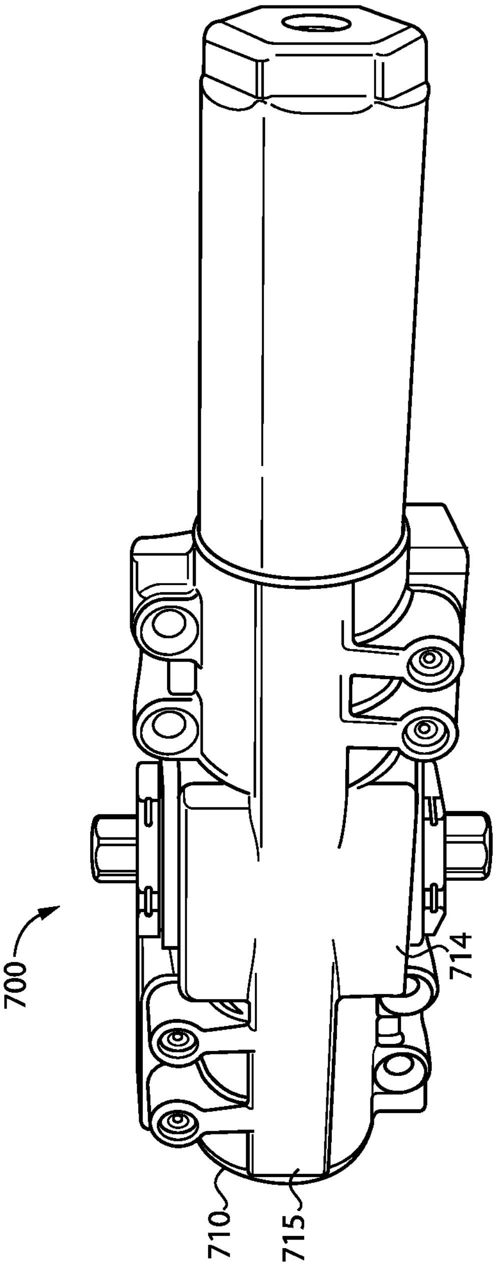
FIG. 10 is a perspective illustration of a door closer including a casing according to certain embodiments.
Figure 11:
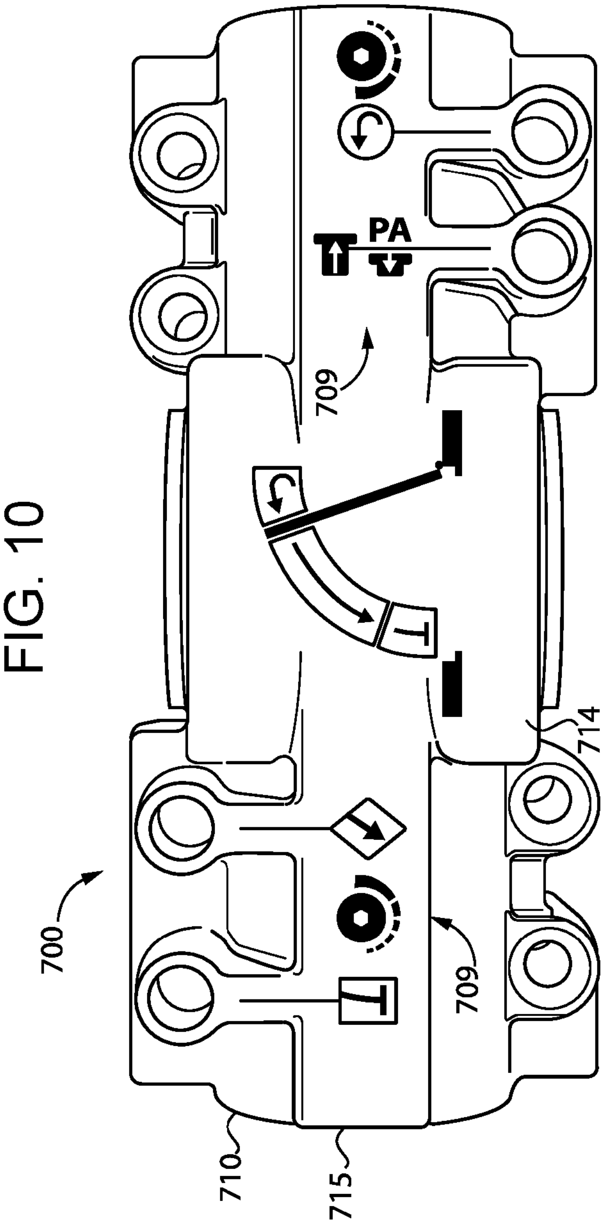
FIG. 11 illustrates the casing of the door closer illustrated in FIG. 10 along with indicia according to certain embodiments.

FIGS. 10 and 11 illustrate another embodiment of a closer 700, in which the casing 710 similarly includes additional material in areas that form flat regions 714, 715. As illustrated in FIG. 11, the casing 710 may be provided with indicia 709 that indicate to the user which of the valves correspond to which of the movement zones. In the illustrated form, the indicia 709 are provided as the arrow-type symbols illustrated in FIG. 4. As should be appreciated, one or more of the indicia 709 may additionally or alternatively be provided in the form of geometric indicia such as those illustrated in FIG. 5, alphanumeric indicia such as those illustrated in FIG. 7, and/or in another form. Furthermore, the indicia 709 may or may not be color-coded.

Figure 12:
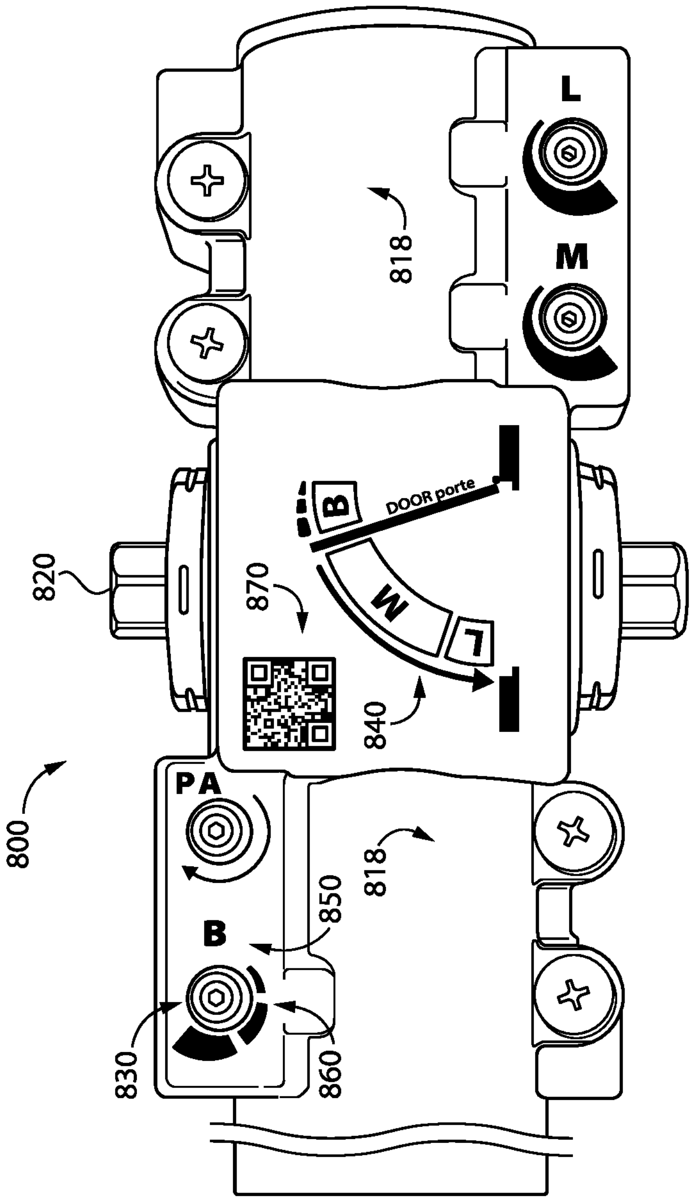
FIG. 12 illustrates a door closer according to certain embodiments.

With reference to FIG. 12, illustrated therein is another embodiment of a door closer 800. The door closer 800 includes certain elements and features that are analogous to those described above with reference to the door closer 300, and which are labeled with similar reference characters. For example, the door closer 800 includes a casing 810, a pinion 820, an adjustment assembly 830, door swing indicia 840, valve function indicia 850, and valve adjustment indicia 860, which respectively correspond to the above-described casing 310, pinion 320, adjustment assembly 330, door swing indicia 340, valve function indicia 350, and valve adjustment indicia 360. In the interest of conciseness, the following description of the door closer 800 is made primarily with reference to elements and features of the door closer 800 that were not specifically described above with reference to the closer 300.

In addition to the indicia 840, 850, 860, the casing 810 of the closer 800 is provided with a matrix-type barcode 870 having encoded therein information relating to the installation and/or adjustment of the door closer 800. For example, the barcode 870 may have encoded therein a hyperlink to a predetermined website having installation and/or adjustment instructions such that the barcode 870, when scanned by a mobile device, directs the user of the mobile device to the website and the instructions stored thereon. While the illustrated barcode 870 is provided in the form of a Quick Response (QR) code, it is to be appreciated that other formats may be utilized.

In the illustrated form, the casing 810 is also provided with manufacturer indicia 818 identifying the manufacturer of the closer 800. In the illustrated form, the manufacturer indicia 818 are integrally formed with the casing 810, while the indicia 840, 850, 860 and barcode 870 are provided to the casing 810 in another manner. For example, the manufacturer indicia 818 may be provided to the casing 810 in the same process by which the remainder of the casing 810 is formed (e.g., stamping, forging, casting, molding); the indicia 840, 850, 860 and barcode 870 may be printed on the surface of the casing 810 itself, or may be formed on an intermediate element (e.g., a sticker or decal) that is applied to the casing 810. It is also contemplated that the manufacturer indicia 818 may be provided to the casing 810 in a manner similar to that described with reference to the indicia 840, 850, 860 and barcode 870, or in another manner, or may be omitted.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as “a,” “an,” “at least one,” or “at least one portion” are used there is no intention to limit the claim to only one item unless specifically stated to the contrary in the claim. When the language “at least a portion” and/or “a portion” is used the item can include a portion and/or the entire item unless specifically stated to the contrary.

What is claimed is:

1. A door closer, comprising:

a casing;

a pinion rotatably mounted to the casing for rotation through a plurality of movement zones;

a rotatable adjustment mechanism mounted to the casing, wherein the rotatable adjustment mechanism comprises a valve configured to adjust an operating characteristic of the door closer for a particular movement zone of the plurality of movement zones; and a movement zone key provided at the door closer, the movement zone key comprising:

a representation of a door swing, including representations of the plurality of movement zones; and a plurality of valve function indicia positioned to relate each valve function indicium with a corresponding movement zone of the plurality of movement zones, the plurality of valve function indicia comprising a first instance of a first valve function indicium, wherein the first instance of the first valve function indicium is positioned to relate the first instance of the first valve function indicium with the particular movement zone;

wherein the door closer further comprises:

a second instance of the first valve function indicium indicating that the rotatable adjustment mechanism is operable to adjust the operating characteristic for the particular movement zone; and a second indicium relating a first rotational direction with a first adjustment effected by rotating the rotatable adjustment mechanism in the first direction.

2. The door closer of claim 1, wherein the operating characteristic pertains to resistance generated by the door closer as the pinion rotates through the particular movement zone.

3. The door closer of claim 1, further comprising a hydraulic passage, wherein the rotatable adjustment mechanism comprises a valve operable to modulate flow of hydraulic fluid through the hydraulic passage.

4. The door closer of claim 1, wherein the first indicium relates to a door swing movement zone.

5. The door closer of claim 1, wherein the particular movement zone comprises a backcheck zone, and wherein the first indicium comprises a graphical representation relating to the backcheck zone.

6. The door closer of claim 1, wherein the particular movement zone comprises a main swing zone, and wherein the first indicium comprises a graphical representation relating to the main swing zone.

7. The door closer of claim 1, wherein the particular movement zone comprises a latching zone, and wherein the first indicium comprises a graphical representation relating to the latching zone.

8. The door closer of claim 1, wherein the rotatable adjustment mechanism is configured to adjust the operating characteristic by modulating a speed of the pinion within the particular movement zone.

9. A door closer, comprising:

a casing;

a pinion rotatably mounted to the casing;

a valve movably mounted to the casing, wherein movement of the valve adjusts a particular operating characteristic of the door closer within a particular movement zone of a plurality of movement zones;

a movement zone key provided to the casing, the movement zone key comprising:

a representation of a door swing, including representations of the plurality of movement zones; and a first instance of a valve function indicium positioned to indicate that the valve function indicium is associated with the particular movement zone; and a second instance of the valve function indicium provided to the casing, the second instance of the valve function indicium indicating that movement of the valve adjusts the particular operating characteristic of the door closer within the particular movement zone.

10. The door closer of claim 9, wherein the pinion is rotatable through a plurality of zones, including a first zone and a second zone; and wherein the particular operating characteristic relates to a rotational speed of the pinion in the first zone.

11. The door closer of claim 10, further comprising:

an additional valve movably mounted to the casing, wherein movement of the additional valve adjusts an additional operating characteristic of the door closer, and wherein the additional operating characteristic relates to a rotational speed of the pinion in the second zone; and an additional valve function indicium indicating movement of the additional valve adjusts the additional operating characteristic.

12. The door closer of claim 9, wherein the valve is configured to discourage manual movement of the valve.

13. The door closer of claim 9, further comprising a valve adjustment indicium, wherein the valve adjustment indicium relates a first movement direction of the valve to a first adjustment effected by moving the valve in the first movement direction.

14. The door closer of claim 9, further comprising a hydraulic passage, wherein the valve is configured to modulate flow of hydraulic fluid through the hydraulic passage.

15. The door closer of claim 9, further comprising a Quick Response (QR) code having encoded therein a hyperlink to a website pertaining to the door closer.

16. A door operator, comprising:

a casing;

a pinion rotatably mounted to the casing;

an adjustment mechanism rotatably mounted to the casing, wherein the door operator is configured to perform a function in response to rotation of the adjustment mechanism, and wherein the function comprises adjusting an operating characteristic of the door operator within a particular movement zone;

a movement zone key positioned on the casing, the movement zone key comprising:

a representation of a door swing, including a representation of the particular movement zone; and a first instance of a functional indicium positioned to indicate that the functional indicium is associated with the particular movement zone; and a second instance of the functional indicium positioned on the casing to thereby identify the function of the adjustment mechanism.

17. The door operator of claim 16, further comprising a hydraulic passage, wherein flow of a hydraulic fluid through the hydraulic passage is correlated with rotation of the pinion through a particular movement zone.

18. The door operator of claim 17, wherein the adjustment mechanism comprises a valve operable to modulate flow of fluid through the hydraulic passage.

19. The door operator of claim 16, further comprising an adjustment indicium positioned on the casing, wherein the adjustment indicium relates a first rotational direction of the adjustment mechanism with a first adjustment effected by rotating the adjustment mechanism in the first rotational direction.

20. The door operator of claim 16, further comprising a matrix barcode having encoded therein information related to the door operator.

21. The door operator of claim 20, wherein the information relating to the door operator pertains to installation and/or adjustment of the door operator.

22. The door operator of claim 20, wherein the information relating to the door operator comprises a hyperlink to a website pertaining to the door operator.

* * * * *